(12) United States Patent
Wang et al.

(10) Patent No.: US 10,674,086 B2
(45) Date of Patent: Jun. 2, 2020

(54) IMAGE PROCESSING METHOD AND DEVICE AND NON-TRANSITORY COMPUTER-READABLE MEDIUM

(71) Applicants: Yiwei Wang, Beijing (CN); Lingyan Liang, Beijing (CN)

(72) Inventors: Yiwei Wang, Beijing (CN); Lingyan Liang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 80 days.

(21) Appl. No.: 15/924,428

(22) Filed: Mar. 19, 2018

(65) Prior Publication Data
US 2018/0359418 A1 Dec. 13, 2018

(30) Foreign Application Priority Data

Jun. 8, 2017 (CN) .......................... 2017 1 0428920

(51) Int. Cl.
*H04N 5/232* (2006.01)
*G06T 7/246* (2017.01)

(52) U.S. Cl.
CPC ......... *H04N 5/23254* (2013.01); *G06T 7/248* (2017.01); *H04N 5/23248* (2013.01); *H04N 5/23258* (2013.01); *H04N 5/23261* (2013.01); *H04N 5/23264* (2013.01); *H04N 5/23267* (2013.01); *H04N 5/23296* (2013.01); *G06T 2207/30241* (2013.01)

(58) Field of Classification Search
CPC ........... H04N 5/23254; H04N 5/23296; H04N 5/23267; H04N 5/23261; H04N 5/23248; H04N 5/23258; H04N 5/23264; G06T 7/248; G06T 2207/30241
See application file for complete search history.

(56) References Cited

U.S. PATENT DOCUMENTS 9,716,832 B2 * 7/2017 Ryu ................... H04N 5/23254
2008/0309769 A1 * 12/2008 Albu ...................... H04N 5/144
348/208.1

(Continued)

FOREIGN PATENT DOCUMENTS

EP 2849428 3/2015
JP 2011-204118 10/2011

(Continued)

OTHER PUBLICATIONS

Extended European Search Report for 18163522.8 dated Aug. 22, 2018.
Japanese Office Action for 2018-075854 dated Apr. 23, 2019.

*Primary Examiner* — Nhan T Tran
(74) *Attorney, Agent, or Firm* — IPUSA, PLLC

(57) ABSTRACT

Image processing method and device are disclosed. The image processing method is inclusive of a step of obtaining a target image; a step of performing motion estimation on the target image so as to attain motion paths; a step of determining, on the basis of the motion paths, whether there exists a fluctuation meeting a predetermined requirement in the target image; and a step of taking, if there exists a fluctuation meeting the predetermined requirement in the target image, the target image as a reference image. The reference image is utilized to carry out inter frame motion estimation with respect to the respective images acquired.

9 Claims, 11 Drawing Sheets

(56) References Cited

U.S. PATENT DOCUMENTS

| | | | | |
|---|---|---|---|---|
| 2009/0028462 A1* | 1/2009 | Habuka | ............... | H04N 1/3876 382/284 |
| 2012/0120264 A1* | 5/2012 | Lee | ........................ | G06T 7/20 348/208.4 |
| 2012/0189167 A1* | 7/2012 | Kurata | .................. | H04N 5/145 382/107 |
| 2014/0104445 A1 | 4/2014 | Ramachandran et al. | | |
| 2014/0267800 A1 | 9/2014 | Slutsky et al. | | |
| 2014/0307110 A1 | 10/2014 | Liu | | |

FOREIGN PATENT DOCUMENTS

| | | |
|---|---|---|
| WO | 2008/087721 | 7/2008 |
| WO | 2008/114264 | 9/2008 |

\* cited by examiner

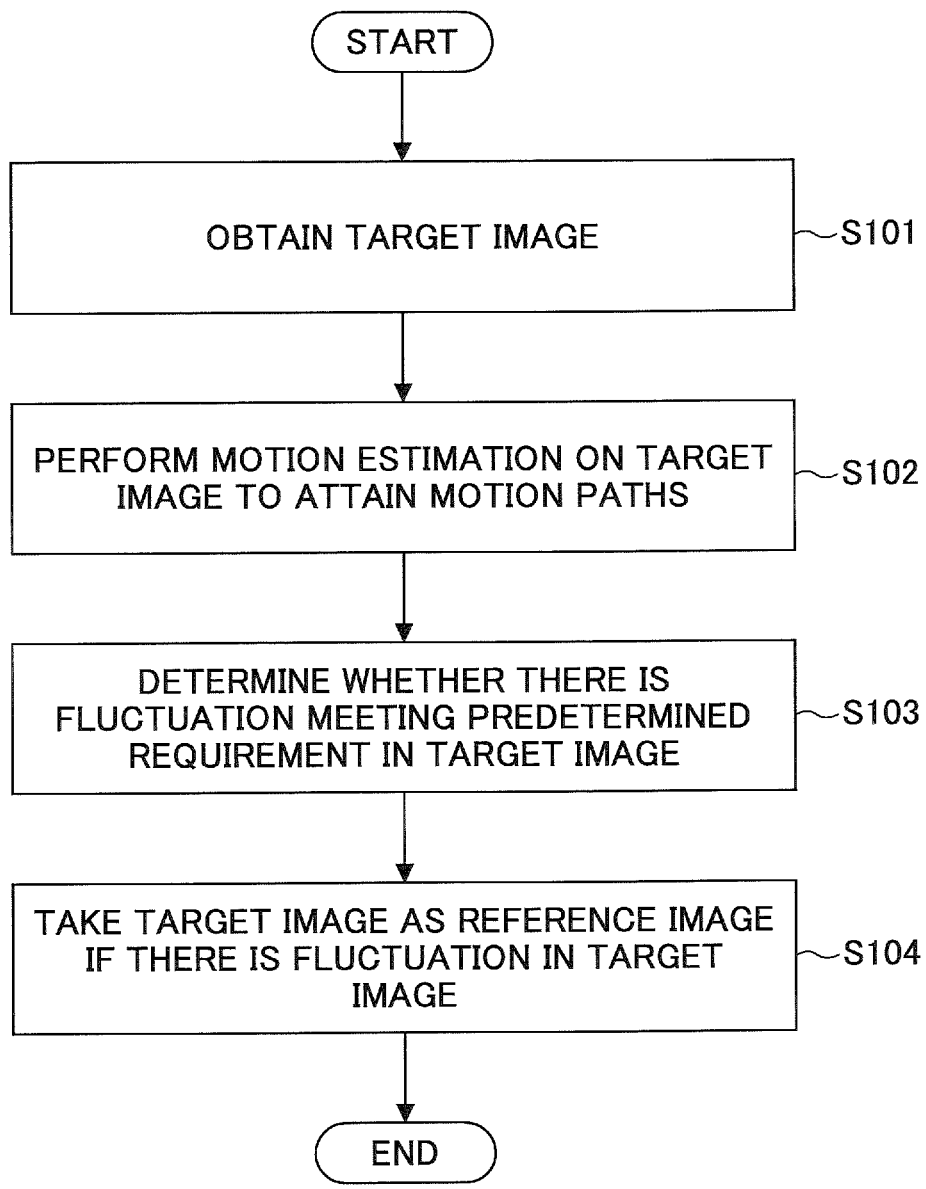

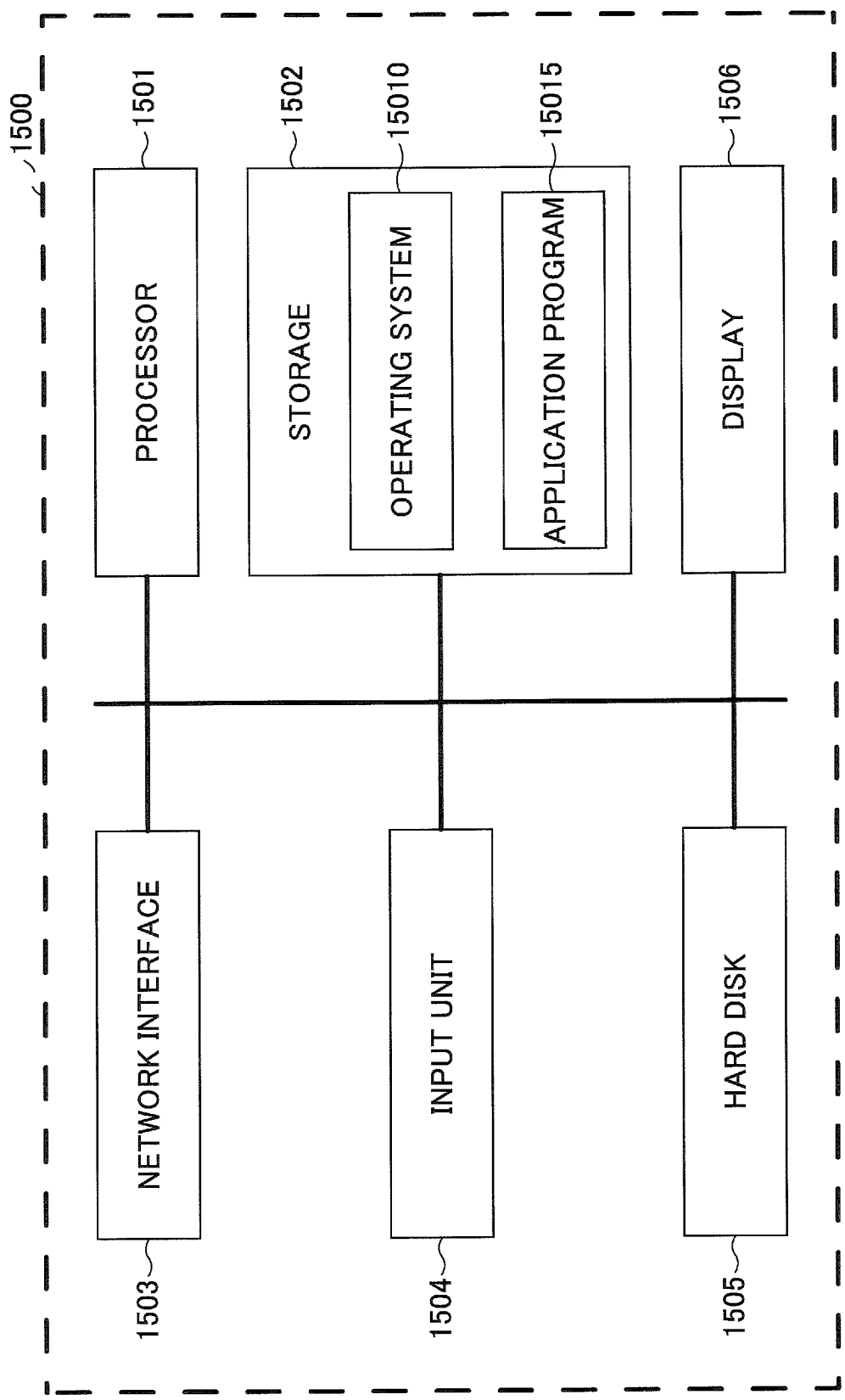

IMAGE PROCESSING METHOD AND DEVICE AND NON-TRANSITORY COMPUTER-READABLE MEDIUM

BACKGROUND OF THE DISCLOSURE

1. Field of the Disclosure

The present disclosure relates to the field of image processing, and more particularly relates to an image processing method and device as well as a non-transitory computer-readable medium.

2. Description of the Related Art

With the development of technologies, hand-held device or mobile platform with a built-in camera is becoming more and more popular. However, there usually exists shaking in the image sequence (i.e., a video) captured by this kind of apparatus.

In order to solve the above-described problem, there are two approaches in conventional techniques by which it is possible to obtain a stable image sequence. The two approaches are real motion path based processing and relative motion path based processing.

The real motion path based processing approach calculates the pose of a hand-held device in the world coordinate system (e.g., using a gyroscope to acquire pose parameters), and converts that into a vertical state, so as to attain a stable image sequence. However, this type of approach actually conducts vertical conversion only one time, so there still exists shaking in the so-called stable video acquired due to errors in calculation.

In addition, the relative motion path based processing approach adjusts the pose of each current image to coincide with the pose of a reference image, thereby gaining a video after image stabilization. The so-called image stabilization refers to a process of removing shaking in the same current image so as to retain main motion. This kind of approach adopts inter frame motion estimation, so the negative influence due to errors in calculation may be weakened. However, since there is still an accumulative error, the effect of image stabilization of the image sequence obtained is not good.

SUMMARY OF THE DISCLOSURE

In light of the above, the present disclosure provides an image processing method and device by which it is possible to improve the effect of image stabilization of the image sequence acquired.

According to a first aspect of the present disclosure, an image processing method is provided which includes steps of obtaining a target image; performing motion estimation on the target image so as to attain motion paths; determining, based on the motion paths, whether there exists a fluctuation meeting a predetermined requirement in the target image; and taking, if there exists a fluctuation meeting the predetermined requirement in the target image, the target image as a reference image. The reference image is used to carry out inter frame motion estimation with respect to the respective images acquired.

According to a second aspect of the present disclosure, an image processing device is provided which includes an image obtainment part configured to obtain a target image; a motion estimation part configured to perform motion estimation on the target image so as to attain motion paths; a determination part configured to determine, based on the motion paths, whether there exists a fluctuation meeting a predetermined requirement in the target image; and a selection part configured to take, if there exists a fluctuation meeting the predetermined requirement in the target image, the target image as a reference image. The reference image is utilized to carry out inter frame motion estimation with respect to the respective images acquired.

According to a third aspect of the present disclosure, a non-transitory computer-readable medium is provided which stores computer-executable instructions for execution by a processing system. The computer-executable instructions, when executed, cause the processing system to carry out the image processing method set forth above.

As a result, it may be understood that by making use of the above-described image processing method and device, it is possible to determine whether a target image may serve as a reference image. Since there is a fluctuation meeting the predetermined requirement in the reference image, by letting the reference image as a benchmark so as to carry out inter frame estimation, the negative influence of a relatively large fluctuation on image stabilization may be reduced. In this way, it is possible to make the effect of image stabilization better.

BRIEF DESCRIPTION OF THE DRAWINGS

FIG. 1 is a flowchart of an image processing method according to a first embodiment of the present disclosure;

FIG. 15 is a block diagram of an electronic apparatus according to a fourth embodiment of the present disclosure.

DETAILED DESCRIPTION OF THE PREFERRED EMBODIMENTS

In order to let a person skilled in the art better understand the present disclosure, hereinafter, the embodiments of the present disclosure will be concretely described with reference to the drawings. However, it should be noted that the same symbols, which are in the specification and the drawings, stand for constructional elements having basically the same function and structure, and the repetition of the explanations to the constructional elements is omitted.

First Embodiment

An image processing method is given in this embodiment.

FIG. 1 is a flowchart of the image processing method according to this embodiment.

As presented in FIG. 1, the image processing method is inclusive of STEPS S101 to S104. In STEP S101 of FIG. 1, a target image (also called a "target frame") is obtained.

The target image refers to any one of images after the first input image (i.e., from the second input image). Here it should be noted that regarding the first input image, only real motion estimation is performed on that in the following step.

In STEP S102 of FIG. 1, motion estimation is conducted in regard to the target image so as to acquire motion paths (trajectories).

Inter frame motion estimation and real motion estimation are carried out with respect to the target image so as to attain an inter frame motion trajectory and a real motion trajectory, respectively.

Figure 2A:
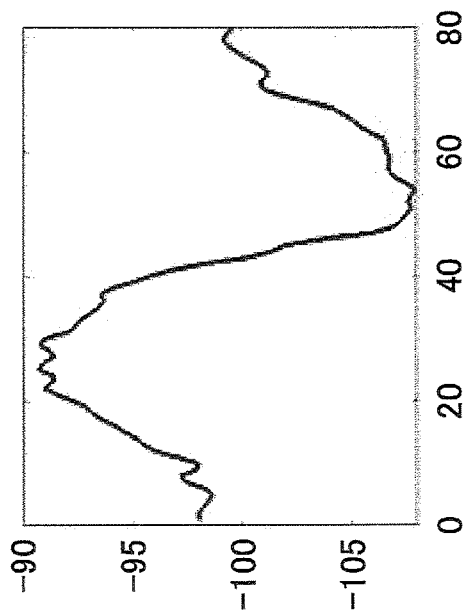
FIGS. 2A and 2B illustrate an example of an inter frame motion trajectory.
Figure 2B:
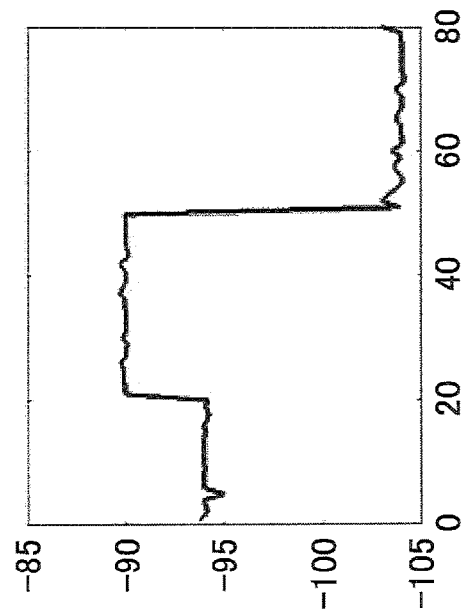

The inter frame motion estimation stands for a process in which an image is taken as a reference image, thereby evaluating the rotation angles of the follow-on respective images relative to the reference image. For example, in a case where the first input image serves as a reference image, the rotation angles of the second and third input images relative to the reference image may be calculated so as to acquire an inter frame motion trajectory, as shown in FIGS. 2A and 2B that illustrates an example of an inter frame motion trajectory. This kind of inter frame motion trajectory computed on the basis of the reference image may reduce the negative influence due to errors in calculation; however, it may also entail an accumulative error.

Figure 2C:
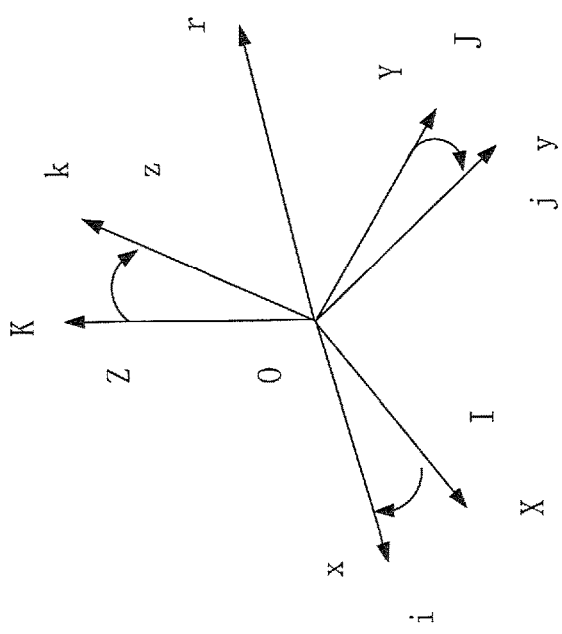
FIGS. 2C and 2D illustrate an example of a real motion trajectory.
Figure 2D:
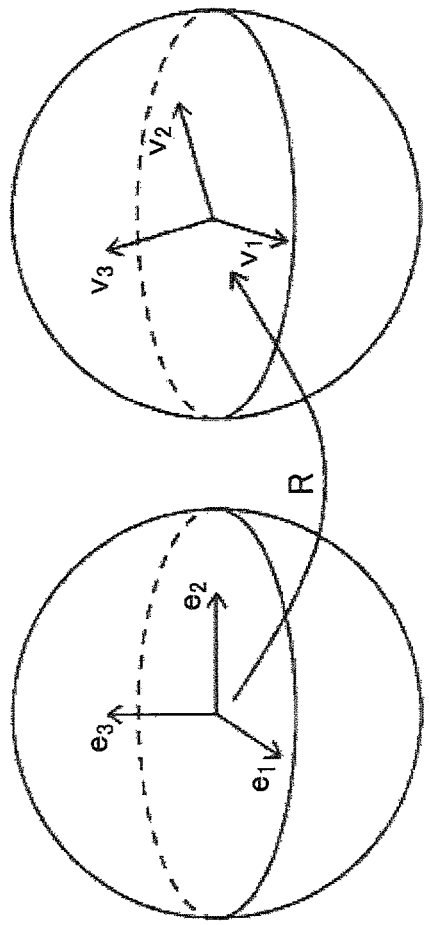

Additionally, the real motion estimation may be achieved by two approaches, namely, gaining sensor parameters and adopting an algorithm such as an approach based on a combination of vanishing point estimation and infinite homography estimation. Real motion parameters may reflect the pose of a hand-held device in the world coordinate system. They may render errors when being calculated, but cannot result in an accumulative error. In this way, it is possible to attain a real motion trajectory, as indicated in FIGS. 2C and 2D which illustrate an example of a real motion trajectory.

In STEP S103 of FIG. 1, it is determined, based on the motion paths, whether there exists a fluctuation meeting a predetermined requirement in the target image.

It is possible to judge, by adopting the following two approaches, whether there is a fluctuation satisfying the predetermined requirement in the target image, namely, (1) determining whether there exists a fluctuation in compliance with the predetermined requirement in the inter frame motion trajectory and the real motion trajectory, respectively; and (2) judging whether there is a fluctuation fitting in with the predetermined requirement in the real motion trajectory.

The fluctuation meeting the predetermined requirement may be one whose amplitude exceeds a predetermined value (threshold) which may be ±5 degrees, i.e., less than −5 degrees or greater than +5 degrees. For instance, in a motion path, if there is a fluctuation beyond ±5 degrees between the trajectory in a current time period and the trajectory in the previous time period, then it may be regarded that there exists a fluctuation satisfying the predetermined requirement in the motion path.

On the grounds of the above, in order to further improve the accuracy of judgement, if it is determined that there is a fluctuation fitting in with the predetermined requirement in the two motion trajectories by using the above approach (1), then it is also possible to acquire the first duration and the second duration of the fluctuation in the two motion trajectories, respectively. Furthermore, if it is judged that there is a fluctuation in compliance with the predetermined requirement in the real motion trajectory by adopting the above approach (2), then the duration of the fluctuation in the real motion trajectory may also be obtained. By means of the fluctuation amounts and durations, it is possible to further determine whether there exists a fluctuation in the two motion trajectories or in the real motion trajectory.

In STEP S104 of FIG. 1, if there is a fluctuation satisfying the predetermined requirement in the target image, then the target image serves as a reference image which is used to carry out inter frame motion estimation with regard to the acquired respective images.

In a case where there exists a fluctuation meeting the predetermined requirement in the target, it is possible to let the target image be a reference image.

On the basis of the above, in order to ameliorate the accuracy of determination, regarding the above approach (1) in STEP S103 of FIG. 1, if the first duration and the second duration are both greater a predetermined threshold, then the target image may play a role of a reference image, and for the above approach (2) in STEP S103 in FIG. 1, if the duration is greater the predetermined threshold, it is also possible to take the target image as a reference image.

The predetermined threshold may be set arbitrarily, for example, a time period necessary to deal with 30 images.

Here it should be noted that an unconscious and short fluctuation of a hand-held device does not negatively affect the effect of image stabilization. However, if a user intentionally adjusts the pose of the hand-held device, then there is a need to timely update the reference image so as to reduce the relevant accumulative error.

Figure 3:
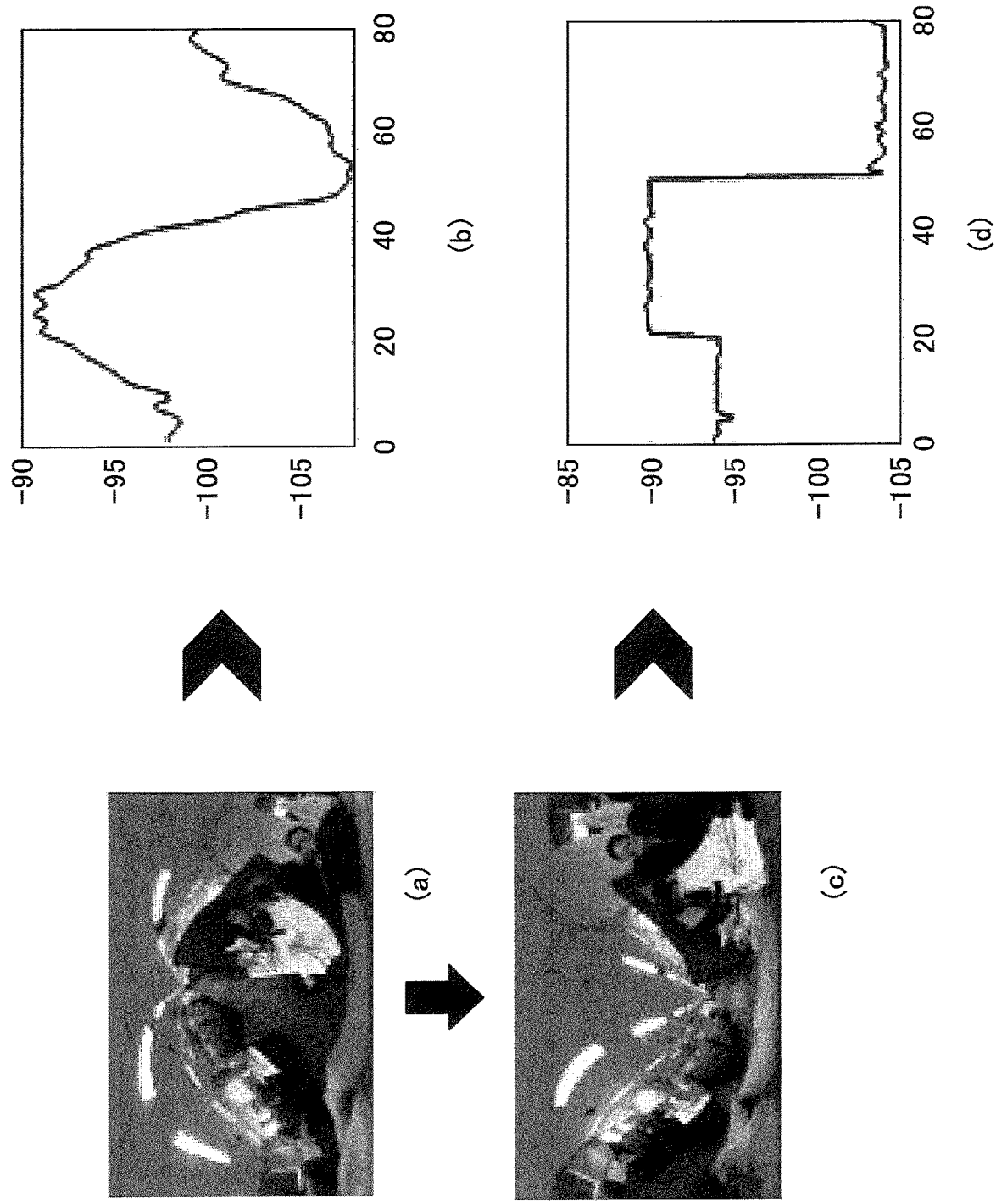
FIG. 3 illustrates an example of a fluctuation occurring in an inter frame motion trajectory and a real motion trajectory when the pose of a hand-held device changes, respectively.

FIG. 3 illustrates an example of fluctuation occurring in an inter frame motion trajectory and a real motion trajectory when the pose of a hand-held device changes, respectively.

As indicated in FIG. 3, when the pose of the hand-held device changes from the state as shown in the image (a) to the state as presented in the image (c), a fluctuation may appear in the real motion trajectory as shown in the image (b) and the inter frame motion trajectory as presented in the image (d), respectively. If the image (d) is taken as an illustration, then the motion trajectory therein changes from the peak at the previous time point to the valley, and the angle difference between the peak and the valley is less than −5 degrees, so it may be deemed that a fluctuation meeting the predetermined requirement occurs in the image (d).

After determining the reference image, it is possible to utilize the reference image so as to conduct inter frame motion estimation in regard to the acquired respective images.

Here it should be noted that for each target image obtained, it may be judged whether to be a reference image by taking advantage of the above-described process. In this way, it is possible to continuously update the reference image.

Therefore, it is clear from the above that a target image may be determined whether to be a reference image. Since there exists a fluctuation satisfying the predetermined requirement in the reference image, by letting the reference image as a criterion so as to carry out inter frame motion estimation, it is possible to reduce the negative influence of a relatively large fluctuation on image stabilization, so as to make the effect of image stabilization better.

Second Embodiment

Figure 4:
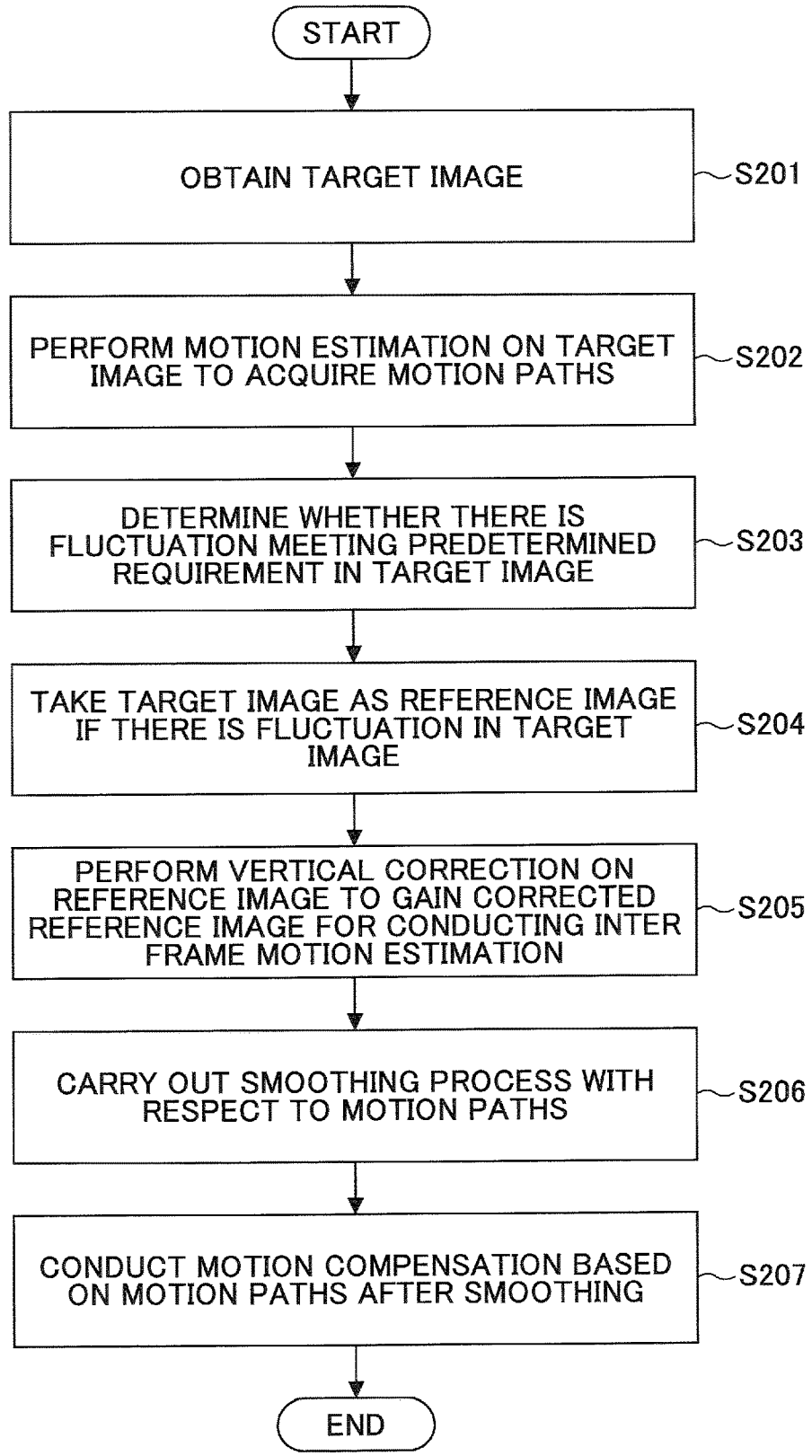
FIG. 4 is a flowchart of another image processing method in accordance with a second embodiment of the present disclosure.

In this embodiment, another image processing method is provided which is on the basis of the image processing method according to the first embodiment. FIG. 4 is a flowchart of the other image processing method.

As presented in FIG. 4, the other image processing method contains STEPS S201 to S207.

In STEP S201, a target image is acquired.

In STEP S202, motion estimation is carried out with respect to the target image so as to attain motion paths (i.e., an inter frame motion trajectory and a real motion trajectory).

In STEP S203, on the basis of the motion paths, it is judged whether there is a fluctuation fitting in with a predetermined requirement in the target image.

In STEP S204, in a case where it is determined that there exists a fluctuation in compliance with the predetermined requirement in the target image, the target image is taken as a reference image.

Here it should be noted that since the details of STEPS S201 to S204 in FIG. 4 are the same as those of STEPS S101 to S104 in FIG. 1, they are omitted here for the sake of convenience.

In STEP S205 of FIG. 4, vertical correction is conducted in regard to the reference image. The corrected reference may be used to perform inter frame motion estimation on the acquired respective images.

Particularly, in this correction process, the average level of motion within each sampling period in the real motion trajectory is determined, and a three dimensional (3D) reference image corresponding to the reference image is acquired. Next, the 3D reference image is rotated on the basis of the average levels of motion so as to let a two dimensional (2D) unfolded view corresponding to the rotated 3D reference image be perpendicular to the line of sight of the relevant user. Here, each sampling period refers to a length of time in which the swing angle of a hand-held device does not beyond a predetermined range. In each sampling period, the average level of motion of the hand-held device stands for the basic pose of the hand-held device in the same sampling period, and if a fluctuation occurs, it may only appear near the basic pose. For each sampling period, the average value of rotation angles of the hand-held device within the same sampling period is calculated, and then, the pose of the hand-held device is inversely transformed to a pose vertical to the surface of the earth on the basis of the average value. In this way, a relatively large distortion may not exist in the image sequence (i.e., a video) captured.

In addition, the fluctuation of a hand-held device is centered on a position that stands for the standard pose of the hand-held device at the corresponding time.

Figure 5:
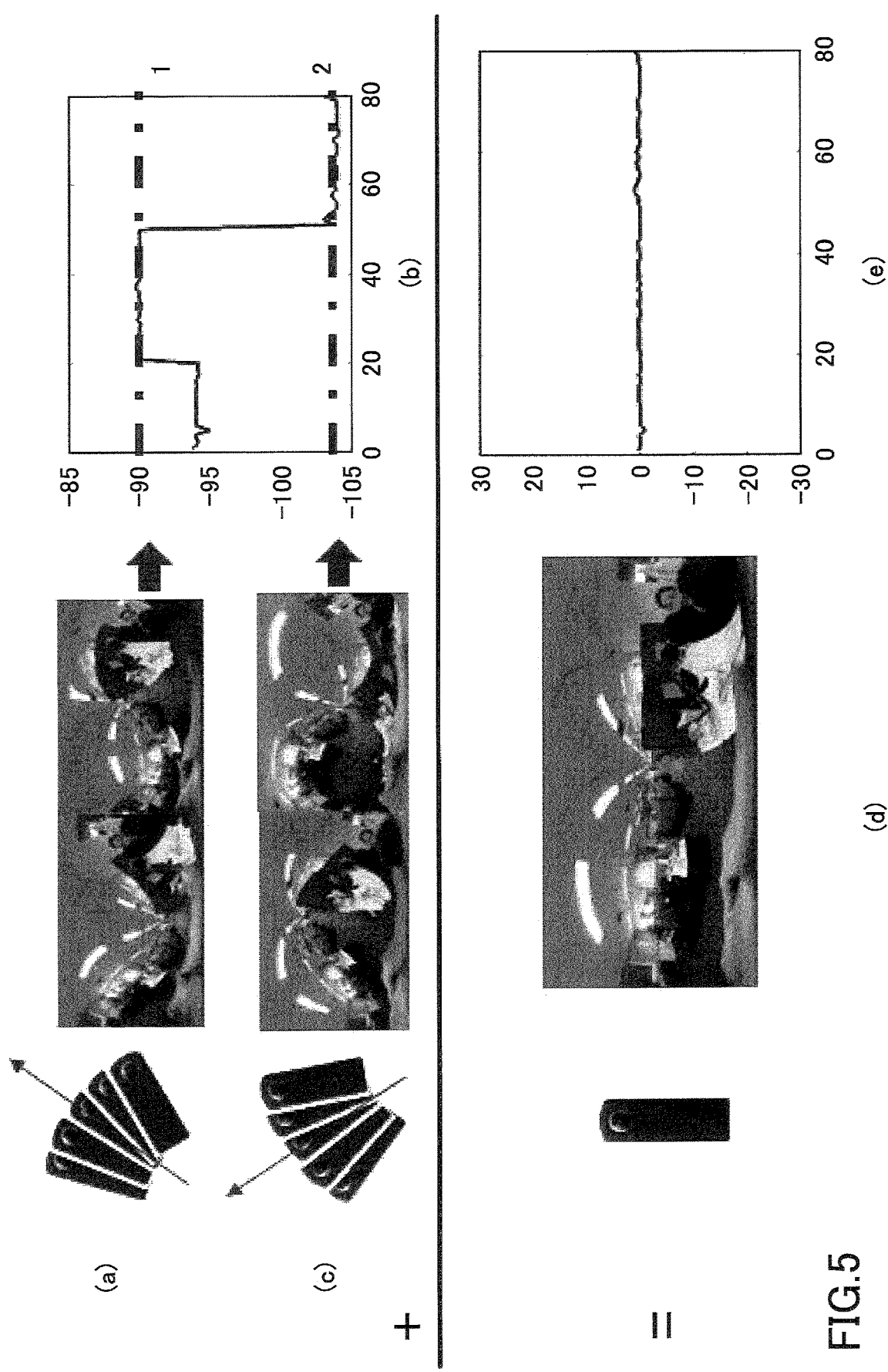
FIG. 5 illustrates an example of vertical correction.

FIG. 5 illustrates an example of vertical correction.

As shown in FIG. 5, the dashed dotted line 1 in the image (b) refers to the benchmark of the fluctuation in the image (a), and the dashed dotted line 2 in the image (b) presents the benchmark of the fluctuation in the image (c). The arrows in the images (a) and (c) stand for the positions where the benchmarks are located, respectively. On the grounds of the benchmarks, it is possible to adjust the pose of the related hand-held device to a state vertical to the surface of the earth, as indicated in the images (d) and (e) in this drawing.

In STEP S206 of FIG. 4, a smoothing process is conducted in regard to the motion paths.

Median filtering is employed in this step so as to carry out the smoothing process with respect to the motion paths. That is, the smoothing process is performed on the inter frame motion trajectory and the real motion trajectory by way of median filtering.

Figure 6:
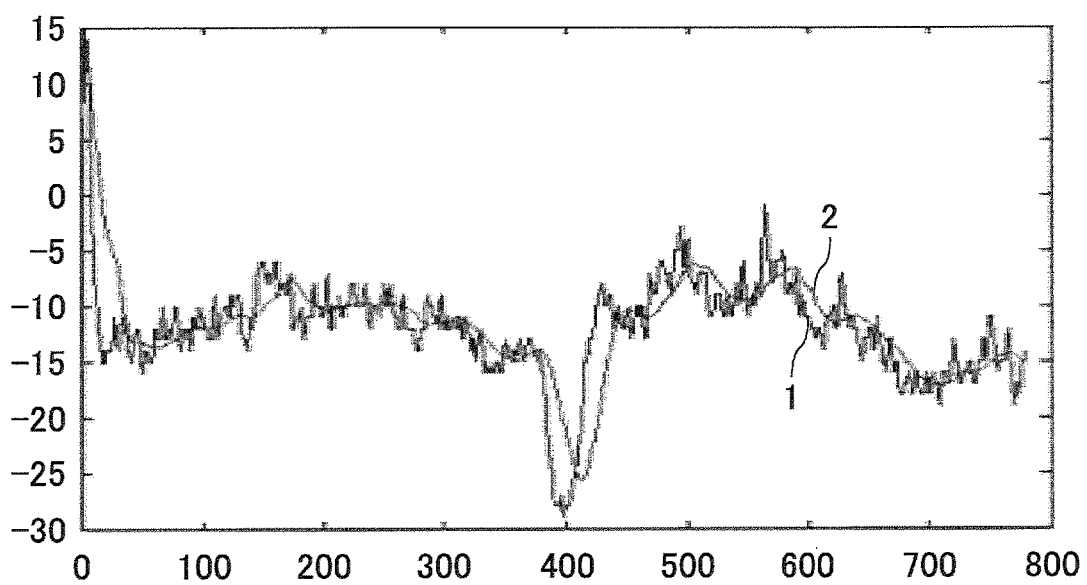
FIG. 6 illustrates an example of a comparison of a motion path before and after smoothing.

FIG. 6 illustrates an example of a comparison of a motion path before and after smoothing.

As presented in FIG. 6, the curve 1 is the calculated motion path of a hand-held device (i.e., before smoothing). After conducting median filtering with regard to the curve 1, it is possible to attain a motion path after smoothing, as shown by the curve 2 in this drawing. The motion path after smoothing retains the main motion of the hand-held device while the relevant fluctuation therein is removed.

In STEP S207 of FIG. 4, motion compensation is carried out in accordance with the motion paths after smoothing.

The target image is projected onto a spherical coordinate system in this step so as to gain a spherical image. Then, coordinate conversion is conducted in regard to the pixel points in the spherical image by using the following equation, so as to acquire a spherical image after image stabilization.

$$\text{Stable(Image)}=R_{smooth}*R_{noise}*\text{Unstable(Image)}+T$$

Here, Stable (Image) is indicative of a spherical image after image stabilization; $R_{smooth}$ refers to a motion path after smoothing; $R_{noise}$ stands for the motion path before smoothing; Unstable(Image) denotes an input image; and T represents a translation matrix.

Finally, by performing inverse transform on the spherical image after image stabilization, it is possible to procure a two dimensional image.

Thus, in this way, an image sequence after image stabilization may be obtained.

Figure 7A:
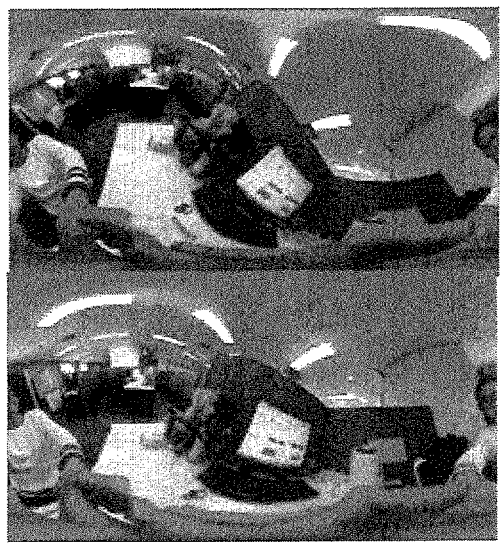
FIGS. 7A and 7B illustrate an example of an image before and after image stabilization.
Figure 7B:
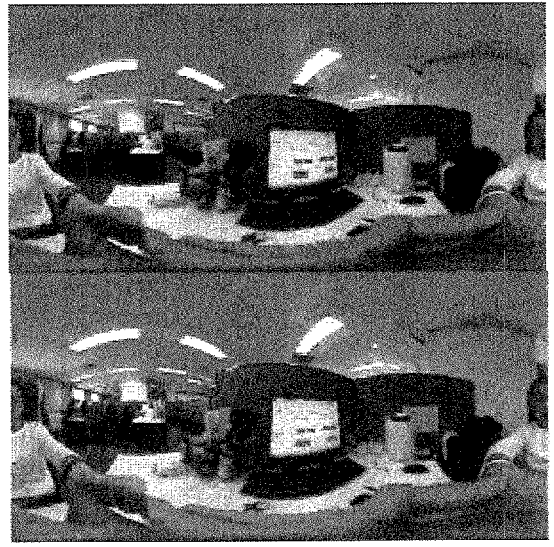

FIGS. 7A and 7B illustrate an example of an image before and after image stabilization.

The image shown in FIG. 7A is one before image stabilization, and the image indicated in FIG. 7B is one after image stabilization.

It may be seen from FIG. 7B that the image after image stabilization is more consistent with the field of vision of a user.

As such, it is obvious from the above that by timely updating the reference image in a stage of motion estimation, it is possible to reduce the negative influence of a relatively large fluctuation on image stabilization, and by correcting the pose of the related hand-held device, the video acquired may be ensured to be perpendicular to the line of sight of the relevant user. In this way, it is possible to provide a more stable video which is more aligned with the field of vision of the relevant user.

Third Embodiment

An image processing device is given in this embodiment.

Figure 8:
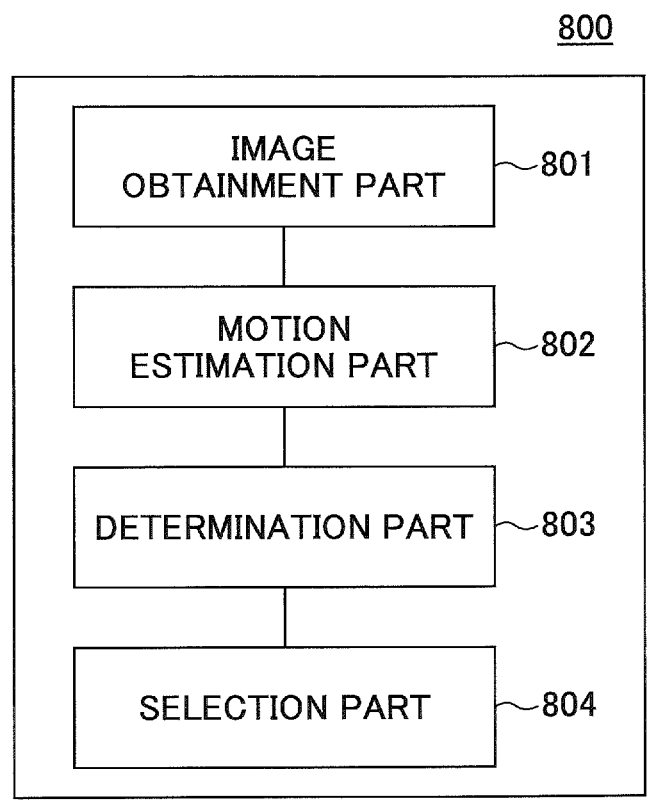
FIG. 8 is a block diagram of an image processing device in accordance with a third embodiment of the present disclosure.

FIG. 8 is a block diagram of an image processing device 800 in accordance with this embodiment, which may execute the image processing methods according to the embodiments of the present disclosure.

As presented in FIG. 8, the image processing device 800 contains an image obtainment part 801, a motion estimation part 802, a determination part 803, and a selection part 804.

The image obtainment part 801 may be configured to obtain a target image (also called a "target frame"), i.e., conduct STEP S101 of FIG. 1.

The motion estimation part 802 may be used to perform motion estimation on the target image so as to acquire motion paths (an inter frame motion trajectory and a real motion trajectory), i.e., carry out STEP S102 of FIG. 1.

The determination part 803 may be utilized to determine, based on the motion paths, whether there exists a fluctuation meeting a predetermined requirement in the target image, i.e., implement STEP S103 of FIG. 1.

The selection part 804 may be configured to, if there exists a fluctuation satisfying the predetermined requirement in the target image, let the target image serve as a reference image, i.e., execute STEP S104 of FIG. 1.

Figure 9:
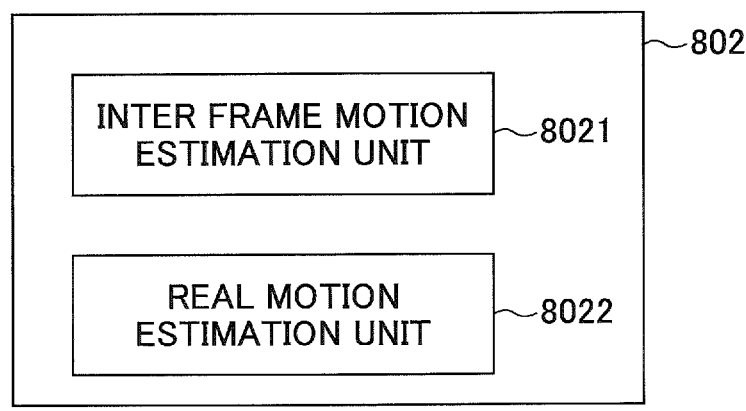
FIG. 9 is a block diagram of a motion estimation part included in the image processing device shown in FIG. 8.

FIG. 9 is a block diagram of the motion estimation part 802.

As shown in FIG. 9, the motion estimation part 802 includes an inter frame motion estimation unit 8021 able to carry out inter frame motion estimation with respect to the target image so as to obtain an inter frame motion trajectory and a real motion estimation unit 8022 capable of conducting real motion estimation in regard to the target image so as to acquire a real motion trajectory.

Figure 10:
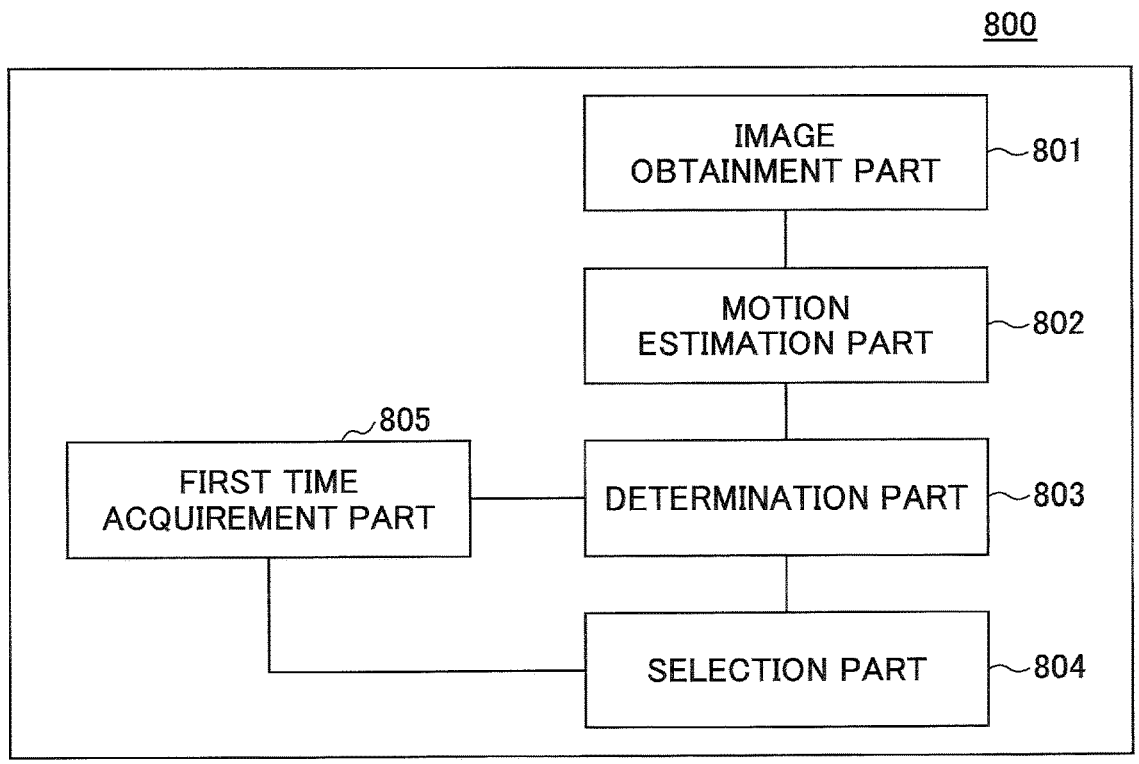
FIG. 10 is another block diagram of the image processing device according to the third embodiment of the present disclosure.

FIG. 10 is another block diagram of the image processing device 800.

As indicated in FIG. 10, the image processing device 800 further includes a first time acquirement part 805 configured to, if there is a fluctuation satisfying the predetermined requirement in the inter frame motion trajectory and the real motion trajectory, respectively, acquire a first duration of the fluctuation in the inter frame motion trajectory and a second duration of the fluctuation in the real motion trajectory. In this case, the selection part 804 may take the target image as a reference image if both the first duration and the second duration are greater than a predetermined threshold.

Here it should be noted that the other parts in FIG. 10 are the same as those in FIG. 8.

Figure 11:
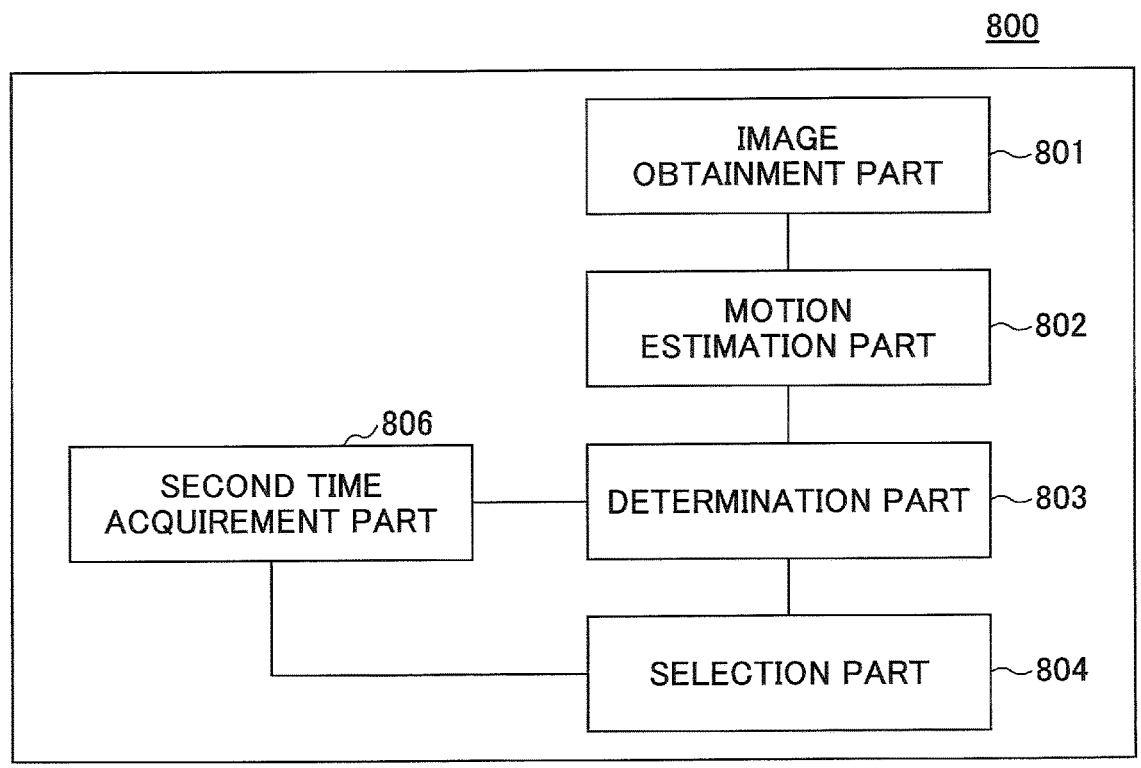
FIG. 11 is still another block diagram of the image processing device in accordance with the third embodiment of the present disclosure.

FIG. 11 is still another block diagram of the image processing device 800.

As presented in FIG. 11, the image processing device 800 further contains a second time acquirement part 806 used to, if there is a fluctuation meeting the predetermined requirement in the real motion trajectory, acquire the duration of the fluctuation in the real motion trajectory. In this case, the selection part 4 may let the target image be a reference image if the duration is greater that a predetermined threshold.

Here it should be noted that the other parts in FIG. 11 are the same as those in FIG. 8.

Figure 12:
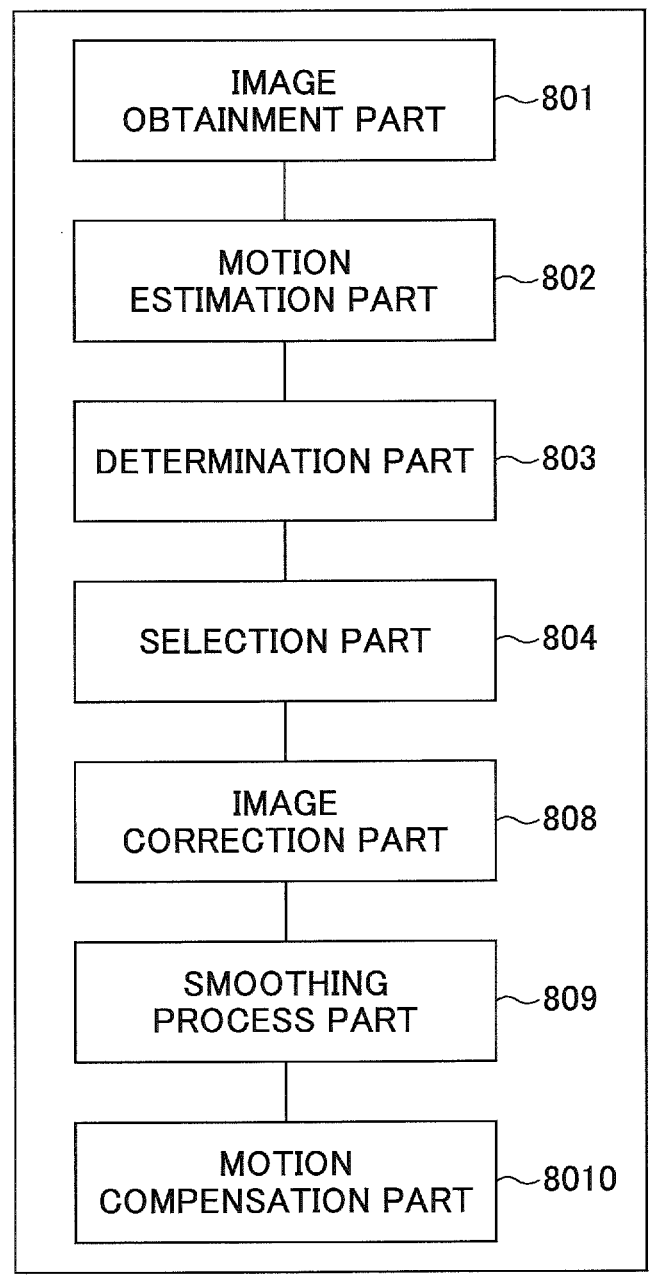
FIG. 12 is yet another block diagram of the image processing device according to the third embodiment of the present disclosure.

FIG. 12 is yet another block diagram of the image processing device 800.

As shown in FIG. 12, the image processing device 800 further contains an image correction part 808, a smoothing process part 809, and a motion compensation part 8010.

The image correction part 808 may be configured to carry out vertical correction with respect to the reference image, and conduct inter frame motion estimation by using the corrected reference image and the acquired respective images.

The smoothing process part 809 may be used to perform a smoothing process on the motion paths.

The motion compensation part 8010 may be utilized to conduct motion compensation on the basis of the motion paths after smoothing.

Figure 13:
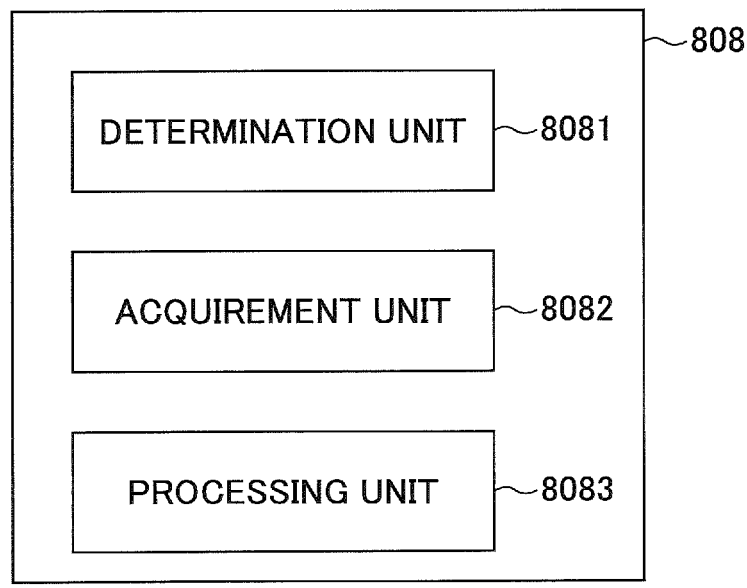
FIG. 13 is a block diagram of an image correction part contained in the image processing device indicated in FIG. 12.

FIG. 13 is a block diagram of the image correction part 808.

As indicated in FIG. 13, the image correction part 808 is inclusive of a determination unit 8081, an acquirement unit 8082, and a processing unit 8083.

The determination unit 8081 may be used to determine the average level of motion within each sampling period in the real motion trajectory.

The acquirement unit 8082 may be configured to acquire a three dimensional (3D) reference image corresponding to the reference image.

The processing unit 8083 may be utilized to rotate, based on the average levels of motion, the 3D reference image so as to cause a two dimensional unfolded view corresponding to the rotated 3D reference image to be perpendicular to the line of sight of the related user.

Here it should be noted that the smoothing process part 809 in FIG. 12 may take advantage of median filtering so as to carry out the smoothing process with respect to the motion paths.

Figure 14:
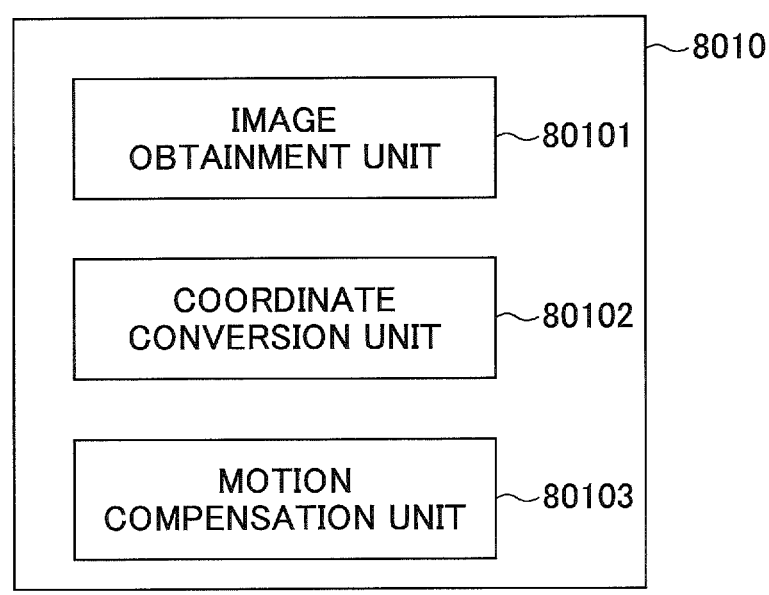
FIG. 14 is a block diagram of a motion compensation part included in the image processing device shown in FIG. 12.

FIG. 14 is a block diagram of the motion compensation part 8010.

As presented in FIG. 14, the motion compensation part 8010 contains an image obtainment unit 80101, a coordinate conversion unit 80102, and a motion compensation unit 80103.

The image obtainment unit 80101 may be configured to project the target image onto a spherical coordinate system so as to obtain a spherical image.

The coordinate conversion unit 80102 may be utilized to conduct coordinate conversion in regard to the pixel points in the spherical image so as to acquire a spherical image after image stabilization.

The motion compensation unit 80103 may be used to transform the spherical image after image stabilization into a two dimensional image.

Here it should be noted that the other parts in FIG. 12 are the same as those in FIG. 8.

In addition, for more information about the operations of all the parts in FIGS. 8 to 14, it is also possible to see the corresponding steps of the image processing methods according to the embodiments of the present disclosure.

Therefore, it is apparent from the above that a target image may be judged whether to be a reference image. Since there is a fluctuation meeting the predetermined requirement in the reference image, by using the reference image as a benchmark to conduct inter frame motion estimation, it is possible to reduce the negative influence of a relatively large fluctuation on image stabilization, so as to ameliorate the effect of image stabilization. In addition, by timely updating the reference image in a stage of motion estimation, it is also possible to weaken the negative influence of a relatively large fluctuation on image stabilization, and by correcting the pose of the relevant hand-held device, the image sequence acquired may be guaranteed to be perpendicular to the line of sight of the related user. In this way, it is possible to provide a more stable video which is more fit for the field of vision of the related user.

Fourth Embodiment

An electronic apparatus is briefly introduced in this embodiment.

FIG. 15 is a block diagram of an electronic apparatus 1500 according to this embodiment.

As presented in FIG. 15, the electronic apparatus 1500 may contain a processor 1501, a storage 1502 including an operating system 15010 and an application program 15015, a network interface 1503, an input unit 1504, a hard disk 1505, and a display 1506 which are connected by a bus.

The processor 1501 may be used to execute a computer program, for example, an application program 15015 stored in the storage 1502 so as to achieve the image processing methods in accordance with the embodiments of the present disclosure.

The storage 1502 may be utilized to store requisite programs and data as well as the intermediate results generated when the processor 1501 executes the application program 15015 in the storage 1502. Here it should be noted that the storage 1502 may further contain an operating system 15010, etc.

The network interface 1503 may be used to connect to a network such as the Internet, a local area network (LAN), or the like.

The input unit 1504 may be utilized to let a user input various instructions, which may be a keyboard or a touch panel, for example.

The hard disk 1505 may be employed to store any information or data necessary to fulfill the image processing methods in accordance with the embodiments of the present disclosure.

The display 1506 may be configured to display the results acquired when executing the application program 15015 in the storage 1502 by the processor 1501, for instance.

Here it should be noted that the embodiments of the present disclosure may be implemented in any convenient form, for example, using dedicated hardware or a mixture of dedicated hardware and software. The embodiments of the present disclosure may be implemented as computer software executed by one or more networked processing apparatuses. The network may comprise any conventional terrestrial or wireless communications network, such as the Internet. The processing apparatuses may comprise any suitably programmed apparatuses such as a general-purpose computer, a personal digital assistant, a mobile telephone (such as a WAP or 3G-compliant phone) and so on. Since the embodiments of the present disclosure can be implemented as software, each and every aspect of the present disclosure thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present disclosure is described with reference to the specific embodiments chosen for purpose of illustration, it should be apparent that the present disclosure is not limited to these embodiments, but numerous modifications could be made thereto by a person skilled in the art without departing from the basic concept and technical scope of the present disclosure.

The present application is based on and claims the benefit of priority of Chinese Patent Application No. 201710428920.7 filed on Jun. 8, 2017, the entire contents of which are hereby incorporated by reference.

What is claimed is:

1. An image processing method comprising:
obtaining a target image;
performing motion estimation on the target image so as to attain motion paths;
determining, based on the motion paths, whether there exists a fluctuation meeting a predetermined requirement in the target image; and
taking, if there exists a fluctuation meeting the predetermined requirement in the target image, the target image as a reference image, the reference image being used to carry out inter frame motion estimation with respect to respective images acquired, wherein
the performing motion estimation on the target image so as to attain motion paths includes conducting inter frame motion estimation and real motion estimation in regard to the target image so as to attain an inter frame motion trajectory and a real motion trajectory, respectively, and
the determining, based on the motion paths, whether there exists a fluctuation meeting a predetermined requirement in the target image includes judging whether there is a fluctuation meeting the predetermined requirement in the inter frame motion trajectory and the real motion trajectory, respectively, wherein
the image processing method further comprising:
after the determining, based on the motion paths, whether there exists a fluctuation meeting a predetermined requirement in the target image, gaining, if there is a fluctuation meeting the predetermined requirement in the inter frame motion trajectory and the real motion trajectory, respectively, a first duration of the fluctuation in the inter frame motion trajectory and a second duration of the fluctuation in the real motion trajectory,
wherein, the taking the target image as a reference image includes
letting, if the first duration and the second duration are both greater than a predetermine threshold, the target image be a reference image.

2. The image processing method according to claim 1, wherein, the determining, based on the motion paths, whether there exists a fluctuation meeting a predetermined requirement in the target image includes
judging whether there is a fluctuation meeting the predetermined requirement in the real motion trajectory.

3. The image processing method according to claim 2, further comprising:
- after the determining, based on the motion paths, whether there exists a fluctuation meeting a predetermined requirement in the target image, gaining, if there is a fluctuation meeting the predetermined requirement in the real motion trajectory, a duration of the fluctuation in the real motion trajectory,
- wherein, the taking the target image as a reference image includes
- letting, if the duration is greater than a predetermined threshold, the target image be a reference image.

4. The image processing method according to claim 1, further comprising:
- conducting vertical correction in regard to the reference image so as to procure a corrected reference image which is utilized to carry out inter frame motion estimation with respect to the respective image acquired;
- performing a smoothing process on the motion paths; and
- carrying out motion compensation based on the motion paths after smoothing.

5. The image processing method according to claim 4, wherein, the conducting vertical correction in regard to the reference image includes
- calculating an average level of motion within each sampling period in the real motion trajectory;
- obtaining a three dimensional reference image corresponding to the reference image; and
- rotating, based on the average levels of motion, the three dimensional reference image, so as to cause a two dimensional unfolded view corresponding to the rotated three dimensional reference image to be perpendicular to a line of sight of a relevant user.

6. The image processing method according to claim 4, wherein, the performing a smoothing process on the motion paths includes
- conducting, by means of median filtering, the smoothing process in regard to the motion paths.

7. The image processing method according to claim 4, wherein, the carrying out motion compensation based on the motion paths after smoothing includes
- projecting the target image onto a spherical coordinate system so as to attain a spherical image;
- carrying out coordinate conversion with respect to pixel points in the spherical image so as to gain a spherical image after image stabilization; and
- transforming the spherical image after image stabilization into a two dimensional image.

8. An image processing device comprising:
a memory; and
a processor coupled to the memory, wherein
the processor
obtains a target image,
performs motion estimation on the target image so as to attain motion paths,
determines, based on the motion paths, whether there exists a fluctuation meeting a predetermined requirement in the target image,
takes, if there exists a fluctuation meeting the predetermined requirement in the target image, the target image as a reference image, the reference image being utilized to carry out inter frame motion estimation with respect to respective images acquired, wherein
when performing motion estimation on the target image so as to attain motion paths, the processor conducts inter frame motion estimation and real motion estimation in regard to the target image so as to attain an inter frame motion trajectory and a real motion trajectory, respectively, and
when determining, based on the motion paths, whether there exists a fluctuation meeting a predetermined requirement in the target image, the processor judges whether there is a fluctuation meeting the predetermined requirement in the inter frame motion trajectory and the real motion trajectory, respectively, and wherein
the processor,
after the processor's determining, based on the motion paths, whether there exists a fluctuation meeting a predetermined requirement in the target image, gains, if there is a fluctuation meeting the predetermined requirement in the inter frame motion trajectory and the real motion trajectory, respectively, a first duration of the fluctuation in the inter frame motion trajectory and a second duration of the fluctuation in the real motion trajectory,
wherein, the processor's taking the target image as a reference image includes
letting, if the first duration and the second duration are both greater than a predetermine threshold, the target image be a reference image.

9. A non-transitory computer-readable medium having computer-executable instructions for execution by a processing system, wherein, the computer-executable instructions, when executed, cause the processing system to carry out the image processing method according to claim 1.

* * * * *